US007934372B2

United States Patent
Haseyama et al.

(10) Patent No.: US 7,934,372 B2
(45) Date of Patent: May 3, 2011

(54) EXHAUST GAS PURIFICATION METHOD AND EXHAUST GAS PURIFICATION SYSTEM

(75) Inventors: Takashi Haseyama, Fujisawa (JP); Takao Onodera, Fujisawa (JP); Yoshinobu Watanabe, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 515 days.

(21) Appl. No.: 12/086,997

(22) PCT Filed: Jan. 10, 2007

(86) PCT No.: PCT/JP2007/050145
§ 371 (c)(1),
(2), (4) Date: Jun. 24, 2008

(87) PCT Pub. No.: WO2007/086252
PCT Pub. Date: Aug. 2, 2007

(65) Prior Publication Data
US 2009/0165445 A1 Jul. 2, 2009

(30) Foreign Application Priority Data
Jan. 27, 2006 (JP) .................................. 2006-018681

(51) Int. Cl.
*F01N 3/025* (2006.01)
(52) U.S. Cl. ................................ 60/286; 60/295; 60/303
(58) Field of Classification Search .................... 60/286, 60/295, 297, 303
See application file for complete search history.

(56) References Cited

U.S. PATENT DOCUMENTS

| 6,345,500 B2 * | 2/2002 | Itou et al. .......................... 60/286 |
| 2004/0244362 A1 | 12/2004 | Hiranuma et al. |
| 2005/0022512 A1 * | 2/2005 | Shirakawa ....................... 60/285 |
| 2005/0060992 A1 * | 3/2005 | Kogo et al. ...................... 60/311 |

FOREIGN PATENT DOCUMENTS
JP 2004-293340 10/2004

OTHER PUBLICATIONS
International Search Report mailed Apr. 24, 2007 in connection with the International application No. PCT/JP2007/050145.

* cited by examiner

*Primary Examiner* — Thomas E Denion
*Assistant Examiner* — Jonathan Matthias
(74) *Attorney, Agent, or Firm* — Staas & Halsey LLP

(57) ABSTRACT

In an exhaust gas purification system (1) for conducting control of raising temperature of a DPF (12*b*) by supplying an unburned fuel to an upstream side of an oxidation catalyst to oxidize it, a minimum value (Qumin) of a first upper limit value (Qu1) acquired by subtracting a fuel injection amount (Qe) for in-cylinder combustion from a first combustible fuel amount (Qa1) limited by an air/fuel ratio, a second upper limit value (Qu2) acquired by subtracting the fuel injection amount (Qe) for in-cylinder combustion from a second combustible fuel amount (Qa2) limited by an atmospheric pressure, and a third upper limit value (Qu3), which is a third combustible fuel amount (Qa3) which can be oxidized by the oxidation catalyst limited by a catalyst temperature index temperature (Tg1, Tg2) and an engine speed (Ne) is set as an upper limit value (Qu) for the unburned fuel supply amount (Qp). By this arrangement, at forced regeneration of the DPF (12*b*), the unburned fuel supplied into an exhaust gas is surely oxidized and generation of white smoke is prevented regardless of an operation state of an internal combustion engine (10).

6 Claims, 7 Drawing Sheets

EXHAUST GAS PURIFICATION METHOD AND EXHAUST GAS PURIFICATION SYSTEM

CROSS REFERENCE TO RELATED APPLICATIONS

This application claims the benefit under 35 U.S.C. Section 371, of PCT International Application Number PCT/JP2007/050145, filed Jan. 10, 2007 and Japanese Application No. 2006-018681 filed Jan. 27, 2006 in Japan, the contents of which are incorporated herein by reference.

BACKGROUND OF THE INVENTION

1. Field of the Invention

The present invention relates to an exhaust gas purification method and an exhaust gas purification system in which an unburned fuel supplied by post injection or the like into an exhaust gas in an exhaust passage of an internal combustion engine is oxidized by an oxidation catalyst and using the resulting oxidation heat, a temperature of a diesel particulate filter is raised for regeneration.

2. Description of the Related Art

Regulations on the amount of particulate matters (PM: particulate matter: Hereinafter referred to as PM) exhausted from a diesel engine as well as NOx, CO, HC, and the like have been tightened year by year. A technology has been developed that the PM is collected by a filter called a diesel particulate filter (DPF: Diesel Particulate Filter: Hereinafter referred to as DPF) to thereby reduce the PM amount exhausted to the outside. A continuous regeneration type DPF device carrying a catalyst is among them.

In this continuous regeneration type DPF device, when an exhaust gas temperature is approximately 350° C. or above, the PM collected by the filter is continuously burned and purified, and the filter is self-regenerated. However, if the exhaust temperature is low, the temperature of a catalyst is lowered and the catalyst is not activated. Thus, the oxidation reaction is not promoted, and oxidation of the PM and regeneration of the filter become difficult. As a result, accumulation of PM on the filter makes clogging of the filter progress, which results in a problem of exhaust pressure rise due to the clogging of the filter.

One of methods to solve such a problem is forced regeneration control for forcedly burning and removing the collected PM by forcedly raising the temperature of exhaust gas when the clogging of the filter exceeds a predetermined amount. In this forced regeneration control, the exhaust gas temperature rise control is conducted so as to raise the temperature of the exhausts gas flowing into the filter to a temperature or above at which the PM collected by the filter is burned.

This kind of exhaust gas temperature rise control includes methods of conducting multiple injection (multiple-stage delayed injection) or post injection in the cylinder (in-cylinder) fuel injection and a direct injection method into an exhaust pipe or the like. The multiple injection is a delayed multiple-stage injection in which the fuel is injected into the cylinder in many stages. By this multiple injection, a fuel amount simply burned in the cylinder without generating torque is increased, and the temperature of the exhaust gas exhausted from the cylinder is raised to a catalyst activation temperature or above of the oxidation catalyst. The post injection is injection for auxiliary injection at timing further delayed from the multiple injection after conducting main injection in the in-cylinder injection. By this post injection, HC (hydrocarbon), which is an unburned fuel, is increased in the exhaust gas exhausted from the cylinder and the HC is oxidized by the oxidation catalyst, by which the temperature of the exhaust gas on the downstream of the oxidation catalyst is raised.

At this exhaust temperature rise, if the exhaust gas temperature is low such as in a case of a low-load/low-speed operation state, the temperature of the exhaust gas flowing into the oxidation catalyst is raised to a catalyst activation temperature or above of an oxidation catalyst by conducting the multiple injection in the first place. Then, after the temperature of the oxidation catalyst has been raised to the catalyst activation temperature or above, the post injection is conducted while the exhaust gas temperature is maintained at the catalyst activation temperature or above, and HC is supplied to the oxidation catalyst. This HC is oxidized by the oxidation catalyst and generates heat, and the exhaust gas flows into the filter in a state where the temperature is further raised. By this high-temperature exhaust gas, the PM accumulated in the filter is burned and removed.

However, if the post injection amount is larger than an amount that can be oxidized by the oxidation catalyst, the unburned fuel is not oxidized but flows out to the downstream side of the exhaust gas purification system, and white smoke is generated. Thus, in order to prevent generation of such white smoke, the fuel injection amount in the post injection is finely controlled so that the post injection amount does not exceed the amount that can be oxidized by the oxidation catalyst.

Examples of the exhaust gas purification system proposed for conducting this control include an exhaust gas purification device in which an oxidation catalyst is arranged on an upstream side and a catalyst regeneration type particulate filter on a downstream side as described in Japanese Patent Application Kokai Publication No. 2004-143988, for example. In this device, a temperature sensor for detecting an exhaust temperature is disposed between the oxidation catalyst and the catalyst regeneration type particulate filter. According to a detected temperature of the temperature sensor, gradual change control is conducted so that the injection amount at the start is increased in a stepped manner and the exhaust gas temperature is raised early to a target temperature. Then, proportional-integral control is conducted so that the exhaust gas temperature is stably maintained at the target temperature for a predetermined time and accurate and fine temperature control is conducted.

In these exhaust gas purification systems, a supply amount of an unburned fuel which can be oxidized by the oxidation catalyst is calculated from the exhaust gas temperature relating to the temperature of the oxidation catalyst. However, since a combustible fuel amount which can be oxidized by the oxidation catalyst also relates to an air excess ratio (or air/fuel ratio) relating to an oxygen amount and an atmospheric pressure, it is not sufficient to simply calculate an upper limit value of the unburned fuel supply amount by a catalyst temperature index temperature indicating the oxidation catalyst temperature. Therefore, generation of white smoke can not be fully prevented.

Patent Document 1: Japanese Patent Application Kokai Publication No. 2004-143988

SUMMARY OF THE INVENTION

The present invention was made in order to solve the above problem of white smoke generation and has an object to provide an exhaust gas purification method and an exhaust gas purification system, wherein in a forced regeneration control of oxidizing an unburned fuel supplied to an exhaust gas by an oxidation catalyst so as to raise a temperature of a DPF at the forced regeneration of the DPF, the unburned fuel supplied into the exhaust gas can be surely oxidized and generation of white smoke, which is an outflow of the unburned fuel, can be prevented regardless of an operation state of an internal combustion engine.

The exhaust gas purification method for achieving the above object is, in an exhaust gas purification system comprising an exhaust gas purification device having an oxidation catalyst device carrying an oxidation catalyst and a diesel particulate filter arranged in order from an upstream side or an exhaust gas purification device having a diesel particulate filter carrying an oxidation catalyst arranged in an exhaust passage of an internal combustion engine, in which at forced regeneration of the diesel particulate filter, if a catalyst temperature index temperature indicating a temperature of the oxidation catalyst becomes equal to a predetermined determining temperature or above, control of raising the temperature of the diesel particulate filter is conducted by supplying the unburned fuel to the upstream side of the oxidation catalyst to thereby oxidize the unburned fuel by the oxidation catalyst, characterized in that a minimum value of a first upper limit value acquired by subtracting a fuel injection amount for in-cylinder combustion from a first combustible fuel amount limited by an air/fuel ratio and a second upper limit value acquired by subtracting the fuel injection amount for in-cylinder combustion from a second combustible fuel amount limited by an atmospheric pressure is set as an upper limit value for the unburned fuel supply amount.

A temperature of the oxidation catalyst (bed temperature) is preferably used as a temperature for determination, however, since direct measurement of the temperature of the oxidation catalyst is difficult, the catalyst temperature index temperature indicating the temperature of the oxidation catalyst is used instead of it. As the catalyst temperature index temperature, a temperature of an exhaust gas flowing into the oxidation catalyst, a temperature of the exhaust gas flowing out of the oxidation catalyst, or a temperature derived from these both temperatures (average temperature or the like, for example) can be used. Moreover, using the both temperatures, respectively, a determination result of the both temperatures can be used for logic of AND or OR. If the temperature of the oxidation catalyst can be measured, the temperature of the oxidation catalyst can be also included in the catalyst temperature index temperature herein.

According to the exhaust gas purification method, when the upper limit value of the unburned fuel supply amount is calculated, the first combustible fuel amount and the second combustible fuel amount derived from the air/fuel ratio and the atmospheric pressure and the fuel injection amount for in-cylinder combustion are considered, and generation of white smoke can be prevented more assuredly.

In the above exhaust gas purification method, by setting a minimum value of the first upper limit value, the second upper limit value, and a third upper limit value, which is a third combustible fuel amount which can be oxidized by the oxidation catalyst limited by the catalyst temperature index temperature and an engine speed, as an upper limit value for the unburned fuel supply amount, the third combustible fuel amount which can be oxidized by the oxidation catalyst can be further considered at calculation of the upper limit value of the unburned fuel supply amount. Thus, generation of white smoke can be prevented further assuredly.

In the above exhaust gas purification method, during the forced regeneration, after the fuel injection amount for in-cylinder combustion and the unburned fuel supply amount are reduced, if the fuel injection amount for in-cylinder combustion and the unburned fuel supply amount are to be increased, respectively, the following effects can be exerted by setting the unburned fuel supply amount at the upper limit value or less and by conducting annealing control of gradually increasing the unburned fuel supply amount to the upper limit value.

According to the control, an annealing processing is conducted so that the supply amount is gradually increased when supply of the unburned fuel is resumed. By this arrangement, even if the temperature is recognized as high due to a difference from the temperature sensor despite the low exhaust gas temperature and the lowered temperature of the oxidation catalyst as in the case where an accelerator pedal is stepped on after deceleration during regeneration, for example, generation of white smoke caused by an excessive supply amount of the unburned fuel can be prevented.

In this annealing control, the unburned fuel supply amount may be continuously increased gradually or in a stepped manner. This speed for increasing the amount is changed depending on a model of an engine, a type of an oxidation catalyst, a diameter, length, or heat capacity of a device carrying the oxidation catalyst, a position of a temperature sensor, or the like. When these parameters are fixed, an optimal speed for increasing the amount can be acquired experimentally, and thus, the increase speed is acquired in advance by an experiment or the like and then stored it in a regeneration control device.

In addition, the exhaust gas purification system for achieving the above object is comprising an exhaust gas purification device having an oxidation catalyst device carrying an oxidation catalyst and a diesel particulate filter arranged in order from an upstream side or an exhaust gas purification device having a diesel particulate filter carrying an oxidation catalyst and a regeneration control device for conducting control of forced regeneration of the diesel particulate filter arranged in an exhaust passage of an internal combustion engine, in which at forced regeneration of the diesel particulate filter, when a catalyst temperature index temperature indicating a temperature of the oxidation catalyst becomes equal to a predetermined determining temperature or above, the regeneration control device conducts control of raising a temperature of the diesel particulate filter by supplying an unburned fuel to the upstream side of the oxidation catalyst to thereby oxidize the unburned fuel by the oxidation catalyst, and the regeneration control device is configured to set a minimum value of a first upper limit value acquired by subtracting a fuel injection amount for in-cylinder combustion from a first combustible fuel amount limited by an air/fuel ratio and a second upper limit value acquired by subtracting the fuel injection amount for in-cylinder combustion from a second combustible fuel amount limited by an atmospheric pressure as an upper limit value for the unburned fuel supply amount.

According to the exhaust gas purification system, when the upper limit value of the unburned fuel supply amount is calculated, the first combustible fuel amount and the second combustible fuel amount derived from the air/fuel ratio and the atmospheric pressure relating to an oxygen amount and the fuel injection amount for in-cylinder combustion are considered, and generation of white smoke can be prevented more assuredly.

In the above exhaust gas purification system, the regeneration control device is configured to set a minimum value of the first upper limit value, the second upper limit value, and a third upper limit value, which is a third combustible fuel amount which can be oxidized by the oxidation catalyst limited by the catalyst temperature index temperature and an engine speed, as an upper limit value for the unburned fuel supply amount.

According to the exhaust gas purification system, when the upper limit value of the unburned fuel supply amount is calculated, the third combustible fuel amount which can be oxidized by the oxidation catalyst is further considered, and thus, generation of white smoke can be prevented more assuredly.

In the above exhaust gas purification system, the regeneration control device is configured so that during the forced regeneration, if the fuel injection amount for in-cylinder combustion and the unburned fuel supply amount are to be increased, respectively after the fuel injection amount for in-cylinder combustion and the unburned fuel supply amount are reduced, the unburned fuel supply amount is set at the upper limit value or less and annealing control of gradually increasing the unburned fuel supply amount to the upper limit value is conducted.

According to the exhaust gas purification system, even if an accelerator pedal is stepped on after deceleration during forced regeneration, the unburned fuel supply amount is prevented from becoming excessive, and generation of white smoke can be prevented.

As described above, according to the exhaust gas purification method and the exhaust gas purification system according to the present invention, in the forced regeneration control of raising a temperature of the DPF by oxidizing the unburned fuel supplied in the exhaust gas by the oxidation catalyst through post injection or the like at forced regeneration of the DPF, the upper limit value of the unburned fuel supply amount is calculated considering not only the temperature of the oxidation catalyst but also the air/fuel ratio (air excess ratio), atmospheric pressure, and the fuel injection amount for in-cylinder combustion, and the unburned fuel supplied in the exhaust gas can be surely oxidized regardless of the operation state of the internal combustion engine, and generation of white smoke, which is an outflow of the unburned fuel, can be prevented.

Moreover, if the unburned fuel supply amount is to be increased after it is reduced at the forced regeneration once, the annealing control is conducted to increase the amount gradually to the upper limit value, and thus generation of white smoke caused by the actual temperature of the oxidation catalyst lower than the temperature of the oxidation catalyst estimated from the detected temperature of the exhaust gas temperature sensor can be prevented.

DETAILED DESCRIPTION OF THE INVENTION

A control method of an exhaust gas purification system and the exhaust gas purification system according to embodiments of the present invention will be described below referring to the attached drawings.

Figure 1:
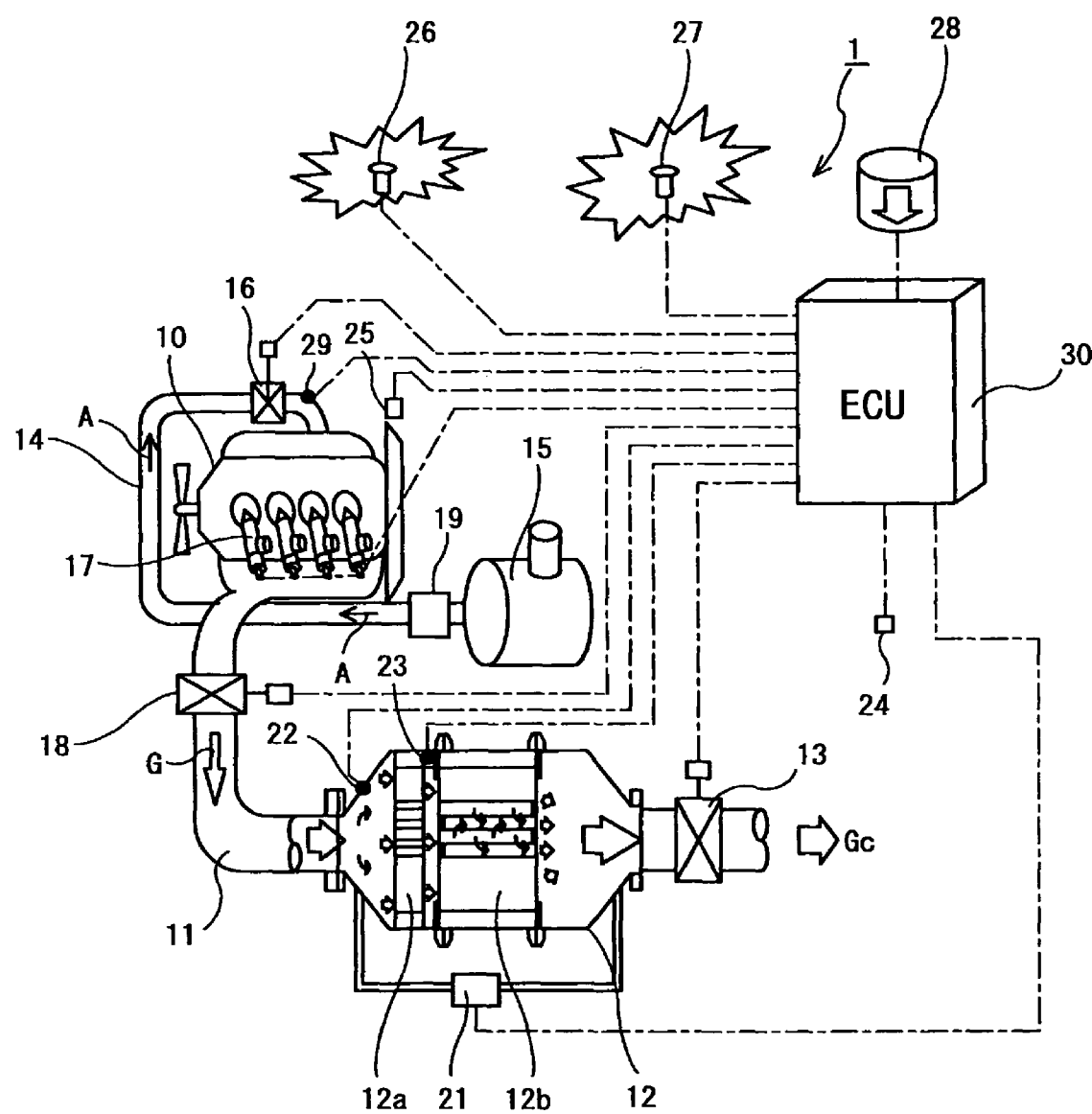
FIG. 1 is a diagram showing entire configuration of an exhaust gas purification system.

FIG. 1 shows a configuration of an exhaust gas purification system 1 according to this embodiment. The exhaust gas purification system 1 is configured to comprise an exhaust gas purification device 12 in an exhaust passage 11 of a diesel engine (internal combustion engine) 10.

The exhaust gas purification device 12 is one of continuous regeneration type DPF (diesel particulate filter) devices and is configured to arrange an oxidation catalyst device 12a on the upstream side and a filter device 12b with catalyst on the downstream side.

The oxidation catalyst device 12a is formed by having an oxidation catalyst such as platinum (Pt) carried by a carrier such as a porous ceramic honeycomb structure. The filter device 12b with catalyst is formed by a filter such as a monolith-honeycomb wall-flow type filter in which an inlet and an outlet of a channel of a porous ceramic honeycomb are alternately sealed. PM (particulate matter) in an exhaust gas G is collected (trapped) by a porous ceramic wall. A catalyst such as platinum, cerium oxide is carried by this filter.

In order to estimate an accumulated amount of the PM in the filter device 12b with catalyst, a differential pressure sensor 21 is provided in a conduit connected to the front and the back of the exhaust gas purification device 12. An exhaust brake valve (exhaust brake) 18 is provided on the upstream side of the exhaust gas purification device 12 and an exhaust throttle valve (exhaust throttle) 13 on the downstream side.

Moreover, for forced regeneration control of the filter device 12b with catalyst, an oxidation-catalyst inlet exhaust-temperature sensor (first temperature sensor) 22 is provided on the upstream side of the oxidation catalyst device 12a and a filter inlet exhaust-temperature sensor (second temperature sensor) 23 between the oxidation catalyst device 12a and the filter device 12b with catalyst, respectively.

This oxidation-catalyst inlet exhaust-temperature sensor 22 detects a first exhaust gas temperature Tg1, which is a temperature of the exhaust gas flowing into the oxidation catalyst device 12a. The filter inlet exhaust-temperature sensor 23 detects a second exhaust gas temperature Tg2, which is a temperature of the exhaust gas flowing into the filter device 12b with catalyst.

In an intake passage 14, an air cleaner 15, an MAF sensor (intake air amount sensor) 19, an intake throttle valve (intake throttle) 16, an intake temperature sensor 29 for detecting an intake temperature Ta, and the like are provided. The intake throttle valve 16 adjusts an amount of an intake A into an intake manifold.

Output values from these sensors are inputted to a controller (ECU: Engine Control Unit) 30 for general control of operation of the engine 10 as well as forced regeneration control of the exhaust gas purification device 12. By a control signal outputted from the controller 30, the intake throttle valve 16, a fuel injection device (injection nozzle) 17, the exhaust throttle valve 13, the exhaust brake valve 18, an EGR valve for adjusting an EGR amount provided in an EGR passage, not shown, with an EGR cooler, and the like are controlled.

The fuel injection device 17 is connected to a common-rail injection system (not shown) temporarily storing high-pressure fuel whose pressure has been raised by a fuel pump (not shown), and into the controller 30, information such as a vehicle speed, cooling water temperature in addition to information such as acceleration opening from an accelerator position sensor (APS) 24, an engine speed from an engine speed sensor 25, and the like are inputted for operation of the engine. The controller 30 outputs an energization time signal so that a predetermined amount of fuel is injected from the fuel injection device 17.

In the forced regeneration control of the exhaust gas purification device 12, forced regeneration is conducted automatically while a vehicle is running. Not only that, but if a collected amount of PM in the filter device 12b with catalyst exceeds a certain amount and the filter device 12b with catalyst is clogged, an operator (driver) arbitrarily stops the vehicle and conducts forced regeneration. For the forced regeneration to be enabled, a flashing lamp (DPF lamp) 26 as a warning means for drawing attention of the driver on the clogging, an alarm lamp 27 lighted at abnormality, and a manual regeneration button (manual regeneration switch) 28 are provided.

In the control of the exhaust gas purification system 1, PM is collected in normal operation. In this normal operation, whether it is forced regeneration timing or not is monitored, and if it is determined as forced regeneration timing, the forced regeneration is conducted. The forced regeneration includes automatic regeneration during running for conducting forced regeneration while the vehicle is running and manual regeneration started when the driver stops the vehicle upon warning and pushes the manual regeneration button 28. These forced regenerations are appropriately selected and conducted depending on a running distance and a DPF differential pressure. The regeneration control device for conducting these forced regeneration controls is incorporated in the controller 30.

Figure 2:
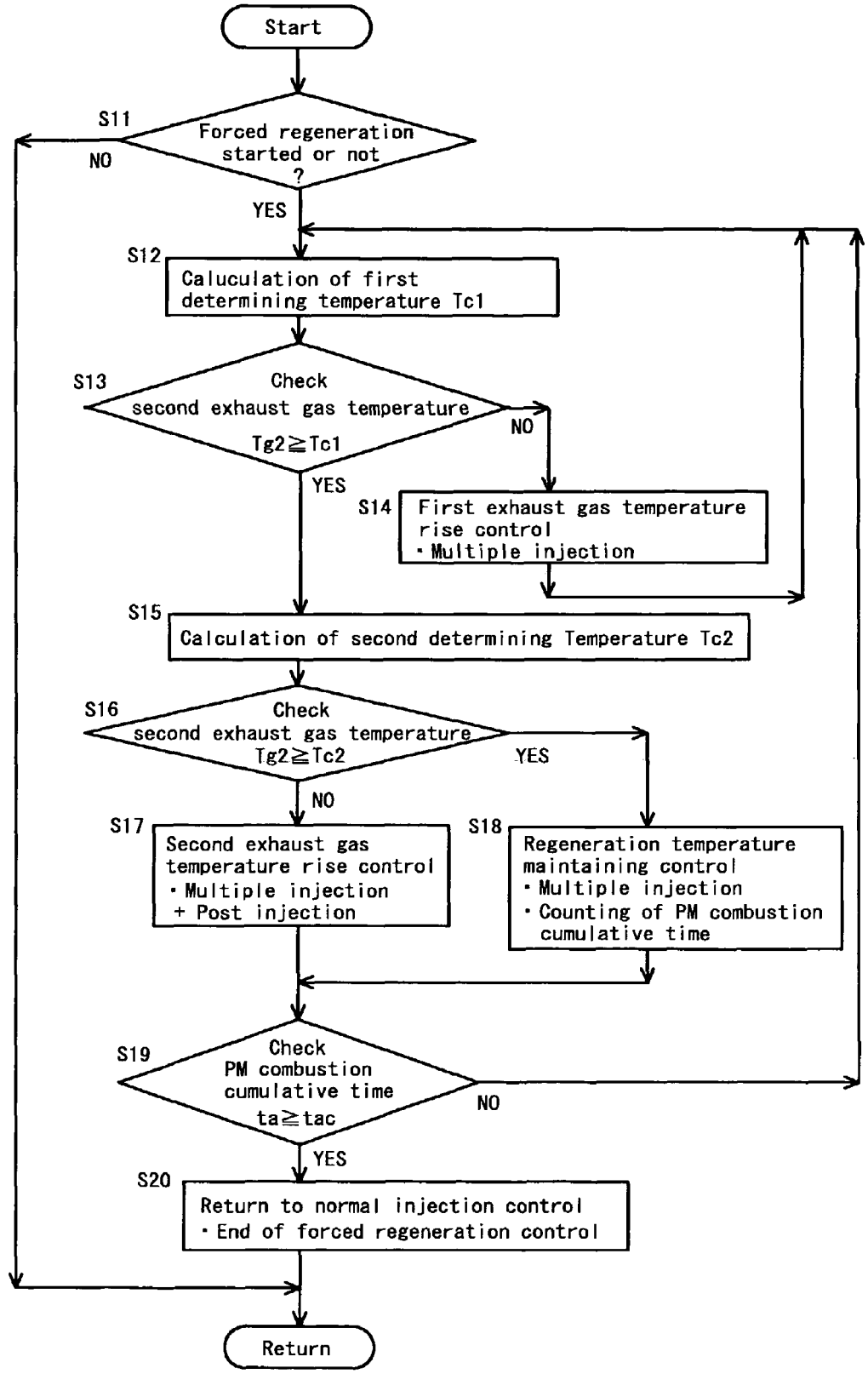
FIG. 2 is a flow chart showing an example of a forced regeneration control.
Figure 3:
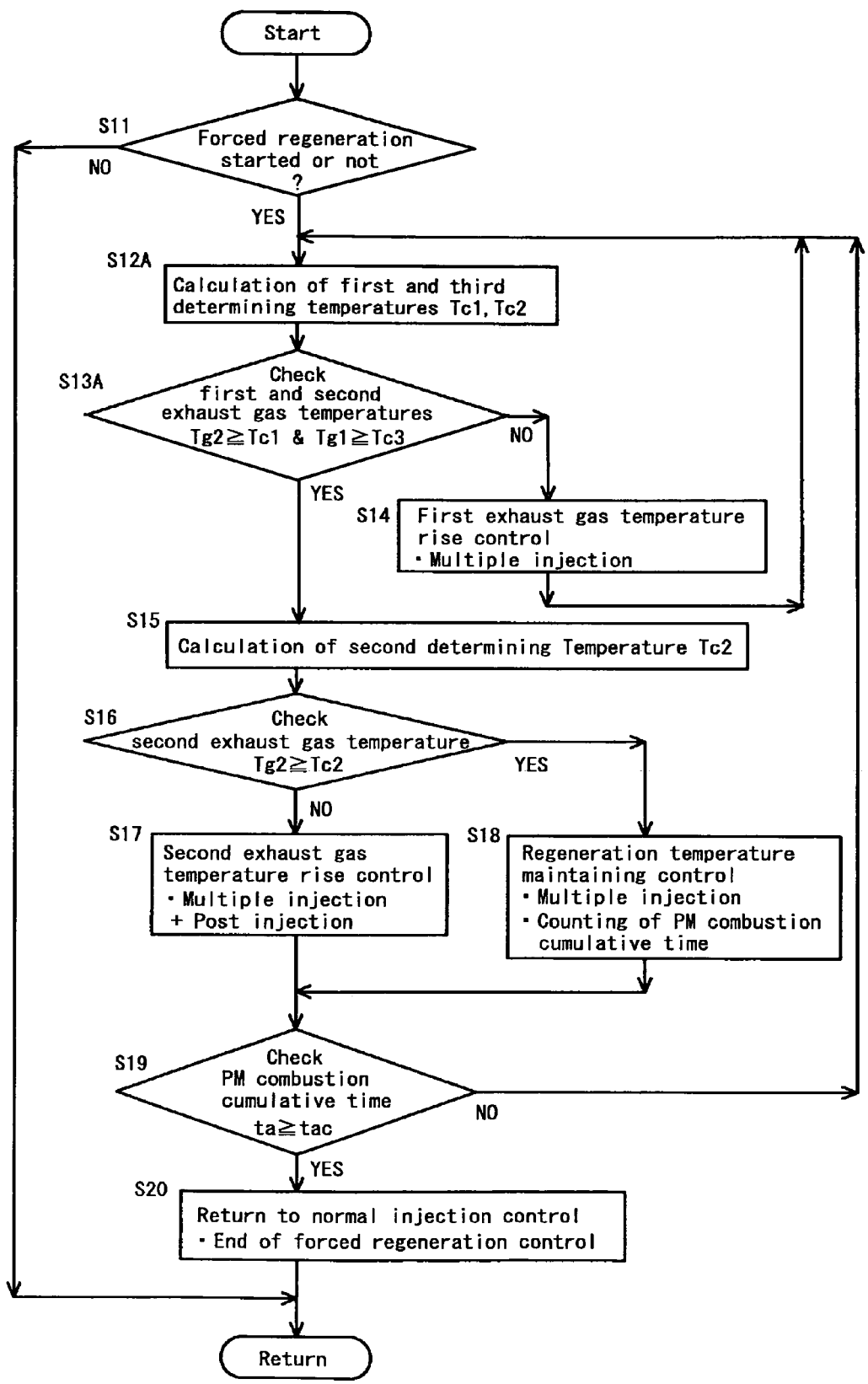
FIG. 3 is a flow chart showing another example of the forced regeneration control.

The forced regeneration such as the manual regeneration and automatic regeneration during running is conducted according to a control flow as exemplified in FIG. 2 or FIG. 3 in this embodiment. In FIG. 2, as the catalyst temperature index temperature indicating a temperature of the oxidation catalyst (bed temperature), the second exhaust gas temperature $Tg2$ detected by the filter inlet exhaust-temperature sensor 23 is used. When the second exhaust gas temperature $Tg2$ becomes equal to a predetermined first determining temperature $Tc1$ or above, the unburned fuel is supplied to the upstream side of the oxidation catalyst device 12a by post injection.

When the control flow in FIG. 2 is started, it is determined if the forced regeneration is started or not at Step S11. If it is not start of the forced regeneration, the forced regeneration is not conducted and the routine returns. If the forced regeneration is started at Step S11, the routine goes to Step S12.

Whether or not it is start of the forced regeneration is determined as follows. If it is the automatic regeneration during running, for example, when it is detected from a detected value of the differential pressure sensor 21 or the like that the collected amount of PM in the filter device 12b with catalyst exceeds a certain amount, the forced regeneration is started. In the case of the manual regeneration, the forced regeneration is started when the driver, who is prompted for the manual regeneration, stops the vehicle and operates the manual regeneration button 28.

At Step S12, the first determining temperature $Tc1$ is calculated. The first determining temperature $Tc1$ is a temperature that if the second exhaust gas temperature $Tg2$ becomes equal to the temperature or above, HC, which is the unburned fuel supplied by the post injection, is sufficiently oxidized by the oxidation catalyst of the oxidation catalyst device 12a.

Figure 7:
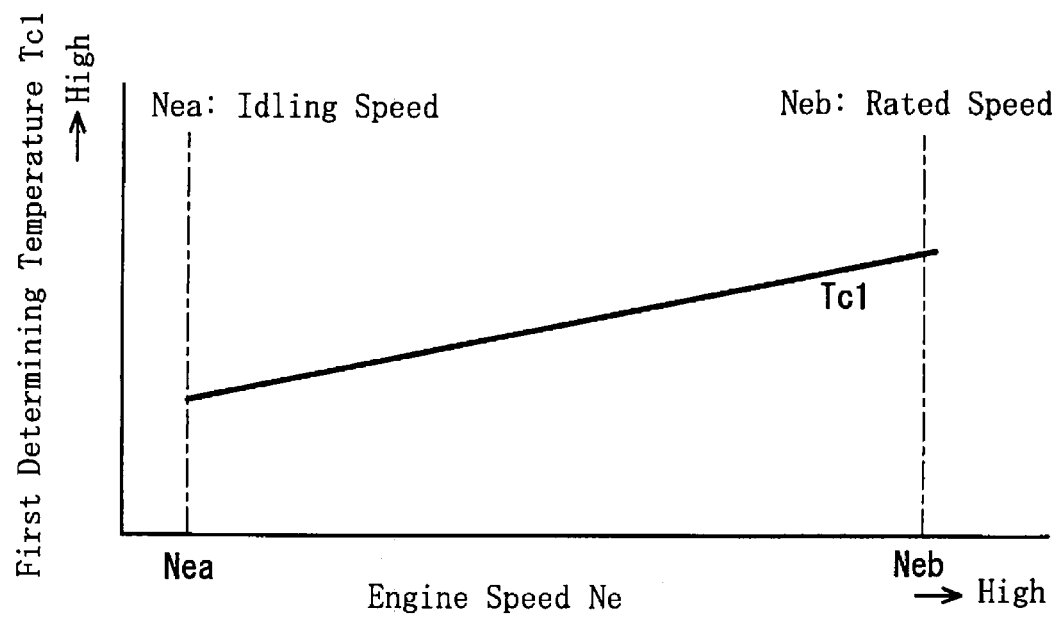
FIG. 7 is a graph showing an example of a relation between an engine speed and a first determining temperature.

The first determining temperature $Tc1$ is, as shown in FIG. 7, set to be changed by an engine speed Ne. That is, it is set to become higher with the increase of the engine speed Ne. In FIG. 7, the post injection is prohibited on the side lower than the first determining temperature $Tc1$, while the post injection is allowed on the upper side. In an example of the first determining temperature $Tc1$, the temperature is approximately 200° C. at an idling speed Nea and approximately 300° C. at a rated speed Neb, between which the temperature is acquired by linear interpolation.

A relation between the engine speed Ne and the first determining temperature $Tc1$ is different depending on the type of the engine, diameter, length, heat capacity, and the like of the oxidation catalyst 12a, arrangement of the exhaust gas purification system 1, and the like. However, if they are fixed, the relation between the engine speed Ne and the first determining temperature $Tc1$ can be grasped in advance by an experiment or the like. Thus, the relation is stored in the controller 30 as map data or functions and the first determining temperature $Tc1$ is calculated from the engine speed Ne by referring to the map data or the like.

At the subsequent Step S13, the second exhaust gas temperature $Tg2$ is checked. If the second exhaust gas temperature $Tg2$ is lower than the first determining temperature $Tc1$ calculated at Step S12, first exhaust gas temperature rise control for conducting multiple injection is conducted at Step S14 for a predetermined time (time relating to an interval of check of the second exhaust gas temperature $Tg2$ at Step S13) $\Delta t1$. And the routine returns to Step S12. If it is determined at Step S13 that the second exhaust gas temperature $Tg2$ is equal to the predetermined first determining temperature $Tc1$ or above, the routine goes to Step S15.

As the catalyst temperature index temperature indicating the temperature of the oxidation catalyst, both the second exhaust gas temperature $Tg2$ detected by the filter inlet exhaust-temperature sensor 23 and the first exhaust gas temperature $Tg1$ detected by the oxidation-catalyst inlet exhaust-temperature sensor 22 may be used. In this case, the first determining temperature $Tc1$ and a third determining temperature $Tc3$ are used as predetermined determining temperatures for the both, respectively. If the second exhaust gas temperature $Tg2$ exceeds the first determining temperature $Tc1$ and the first exhaust gas temperature $Tg1$ exceeds the third determining temperature $Tc3$, the unburned fuel is supplied to the upstream side of the oxidation catalyst device 12a by the post injection.

In this case, Step S12 and Step S13 in FIG. 2 are replaced by Step S12A and Step S13A in FIG. 3. At Step S12A, the third determining temperature $Tc3$ is calculated in addition to the first determining temperature $Tc1$. Values of the first determining temperature $Tc1$ and the third determining temperature $Tc3$ are set to be changed by the engine speed Ne. That is, they are set to become higher with the increase of the engine speed Ne.

The relation between the engine speed Ne and the first determining temperature $Tc1$ or the third determining temperature $Tc3$ is different depending on the type of the engine, diameter, length, heat capacity, and the like of the oxidation catalyst 12a, the arrangement of the exhaust gas purification system 1, and the like. However, if they are fixed, the relation between the engine speed Ne and the first determining temperature $Tc1$ or the third determining temperature $Tc3$ can be grasped in advance by an experiment or the like. Thus, the relation is stored in the controller 30 as map data or functions and the first determining temperature $Tc1$ and the third determining temperature $Tc3$ are calculated from the engine speed Ne by referring to the map data or the like.

At Step S13A, it is determined if the second exhaust gas temperature $Tg2$ is equal to the first determining temperature Tc1 or above and if the first exhaust gas temperature Tg1 is equal to the third determining temperature Tc3 or above. Only if the second exhaust gas temperature Tg2 is equal to the first determining temperature Tc1 or above and the first exhaust gas temperature Tg1 is equal to the third determining temperature Tc3 or above, the routine goes to Step S15, while in the other cases, the routine goes to Step S14.

At Step S15, the second determining temperature Tc2 is calculated. The second determining temperature Tc2 is a target temperature for second exhaust gas temperature rise control at Step S17. By maintaining the second exhaust gas temperature Tg2, which is a temperature of the exhaust gas detected by the filter inlet exhaust-temperature sensor 23, at this temperature or above, combustion of the PM collected in the filter device 12b with catalyst is maintained in a favorable state. The second determining temperature Tc2 is usually set at a value higher than a combustion start temperature of the PM (approximately 350° C., for example), at approximately 500° C., for example. It may be changed in many stages according to time.

At the subsequent Step S16, the second exhaust gas temperature Tg2 is checked. If the second exhaust gas temperature Tg2 is lower than the second determining temperature Tc2, the routine goes to the second exhaust gas temperature rise control at Step S17, while if the second exhaust gas temperature Tg2 is equal to the second determining temperature Tc2 or above, the routine goes to regeneration temperature maintaining control at Step S18.

At Step S17, the second exhaust gas temperature rise control for conducting the post injection in addition to the multiple injection is conducted for a predetermined time (time relating to an interval of check of the second exhaust gas temperature Tg2 at Step S16) Δt2. In this second exhaust gas temperature rise control, the exhaust gas temperature is raised by the multiple injection and at the same time, HC (unburned fuel) supplied into the exhaust gas by the post injection is oxidized by the oxidation catalyst and then generates heat. By this heat generation, the exhaust gas flows into the filter device 12b with catalyst in the state that the second exhaust gas temperature Tg2 is raised higher than the first exhaust gas temperature Tg1. After the Step S17, the routine goes to Step S19.

If it is determined at Step S16 that the second exhaust gas temperature Tg2 is equal to the second determining temperature Tc2 or above, the regeneration temperature maintaining control for conducting the multiple injection in the in-cylinder injection of the engine 10 is conducted for a predetermined time (time relating to an interval of duration time check of the second exhaust gas temperature Tg2 at Step S16) Δt3 at Step S18.

At Step S18, PM combustion cumulative time is also counted. In this count, only if the second exhaust gas temperature Tg2 is equal to the predetermined second determining temperature Tc2 or above, the PM combustion cumulative time ta is counted (ta=ta+Δt3). After the Step S18, the routine goes to Step S19.

At Step S19, in order to determine if the forced regeneration control is to be finished or not, the PM combustion cumulative time ta is checked. In this check, it is checked if the PM combustion cumulative time ta exceeds a predetermined determining time Tac or not. That is, if it is exceeded, the forced regeneration is determined to be completed, and the routine goes to Step S20, while if not exceeded, the forced regeneration is determined not to be completed, and the routine returns to Step S12. Till the PM combustion cumulative time ta exceeds the predetermined determining time tac, the first exhaust gas temperature rise control at Step S14, the second exhaust gas temperature rise control at Step S17, or the regeneration temperature maintaining control at Step S18 is conducted.

At Step S20, the forced regeneration control is finished, and the routine returns to the normal injection control. And then, it returns.

In the first and second exhaust gas temperature rise controls and regeneration temperature maintaining control, intake throttle by the intake throttle valve 16, the EGR valve, or the like and exhaust throttle by the exhaust throttle valve 13, the exhaust brake valve 18, or the like are used at the same time.

When the filter device 12b with catalyst is forcedly regenerated by the forced regeneration control according to the control flow in FIG. 2 or FIG. 3, in the following cases, such control can be conducted that the unburned fuel (HC) is supplied to the upstream side of the oxidation catalyst by the second exhaust temperature rise control and then the unburned fuel is oxidized by the oxidation catalyst to raise the temperature of the filter device 12b with catalyst. First, the control can be conducted when the catalyst temperature index temperature Tg2 indicating the temperature of the oxidation catalyst as shown in FIG. 2 is equal to the first determining temperature Tc1 or above, which is a predetermined determining temperature changed according to the engine speed Ne of the internal combustion engine 10 at the time. Secondly, the control can be conducted when the first catalyst temperature index temperature (second exhaust gas temperature) Tg2 indicating the temperature of the oxidation catalyst as shown in FIG. 3 is equal to the first determining temperature Tc1 or above, which is the predetermined determining temperature changed according to the engine speed Ne of the internal combustion engine 10 at the time and the second catalyst temperature index temperature (first exhaust gas temperature) Tg1 similarly indicating the temperature of the oxidation catalyst is equal to the third determining temperature Tc3 or above, which is the predetermined determining temperature changed according to the engine speed Ne of the internal combustion engine 10 at the time.

In the present invention, an upper limit value Qu is set for a post injection amount Qp in the second exhaust gas temperature rise control at Step S17, that is, an unburned fuel supply amount Qp. The upper limit value Qu is set as a minimum value Qumin among a first upper limit value Qu1, a second upper limit value Qu2, and a third upper limit value Qu3 (Qu=Qumin).

The first upper limit value Qu1 is acquired by subtracting a fuel injection amount Qe for in-cylinder combustion from a first combustible fuel amount Qa1 limited by the intake air amount detected by the MAF (mass air flow) sensor 19 (Qu1=Qa1−Qe).

Figure 4:
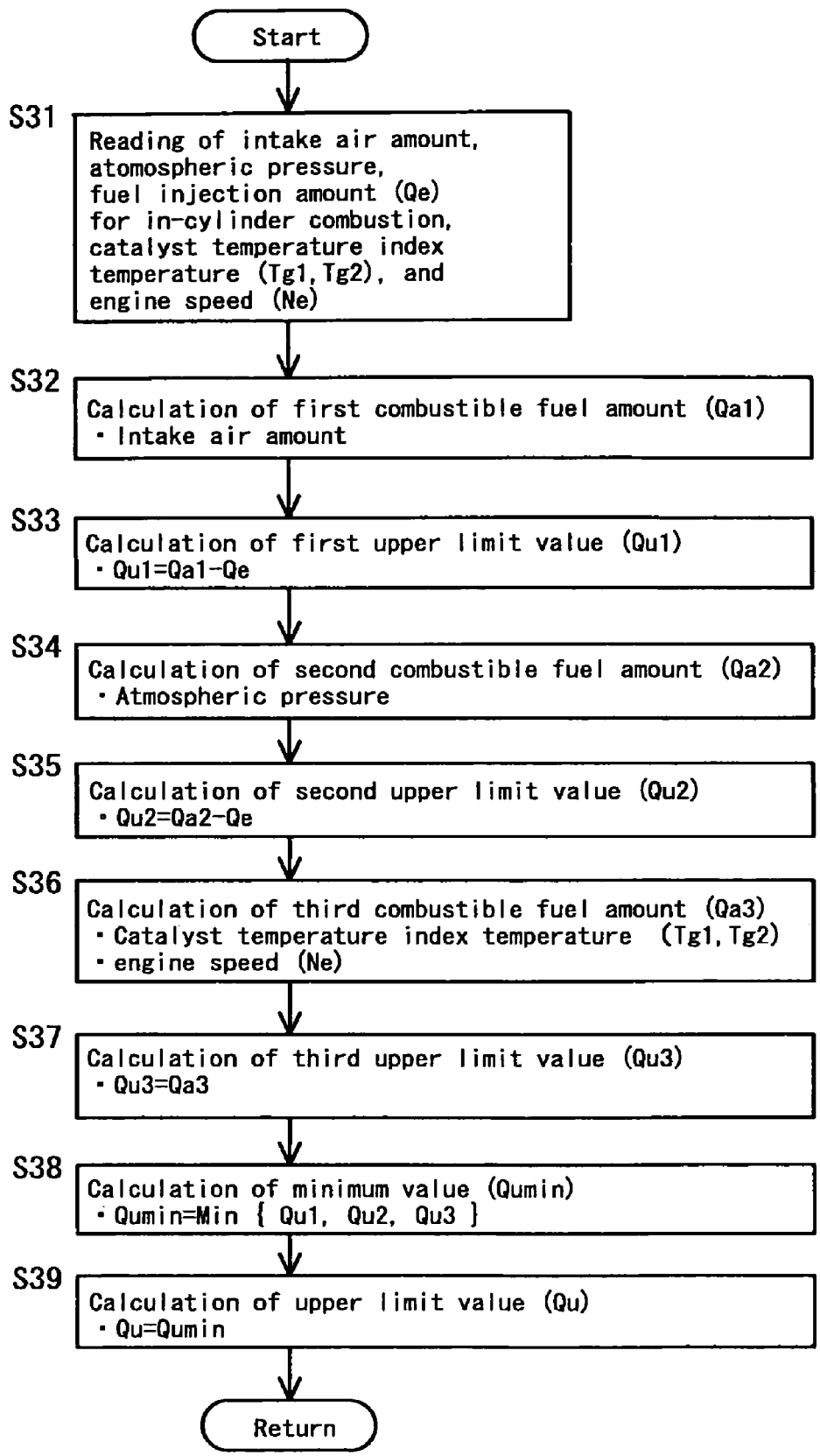
FIG. 4 is a flow chart showing an example for acquiring an upper limit value of a post injection amount.

The second upper limit value Qu2 is acquired by subtracting the fuel injection amount Qe for in-cylinder combustion from a second combustible fuel amount Qa2 limited by an atmospheric pressure (Qu2=Qa2−Qe). The third upper limit value Qu3 is an amount relating to an activation temperature of the oxidation catalyst and is set as a third combustible fuel amount Qa3 which can be oxidized by the oxidation catalyst limited by the exhaust gas temperature Tg1 (or Tg2) and the engine speed Ne (Qu3=Qa3). The calculations can be made according to a flow as shown in FIG. 4.

The first combustible fuel amount Qa1 and the second combustible fuel amount Qa2 are amounts determined by the intake air amount and the atmospheric pressure, respectively. The amounts Qa1, Qa2 are fuel amounts which can be burned or oxidized not only in the combustion in the cylinder of the engine but throughout the system including the exhaust system. That is, they are the fuel amounts that can be consumed by in-cylinder combustion and oxidation by the oxidation catalyst. Thus, by using them for the calculation of the upper limit values, the amount of the unburned fuel supplied into the exhaust gas also falls within a range that can be oxidized with regard to the oxygen amount. Therefore, generation of white smoke can be prevented.

Moreover, during the forced regeneration, when the fuel injection amount Qe for in-cylinder combustion and the post injection amount Qp are to be increased, respectively, after the fuel injection amount Qe for in-cylinder combustion and the post injection amount Qp are reduced, as in a case where the accelerator pedal is stepped on again a while after the accelerator pedal is released at deceleration or the like and the exhaust temperature is lowered, the configuration is made as follows. The post injection amount Qp is set at the upper limit value Qu or less and the annealing control for gradually increasing the post injection amount Qp to the upper limit value Qu as shown in FIG. 5 is conducted.

Figure 5:
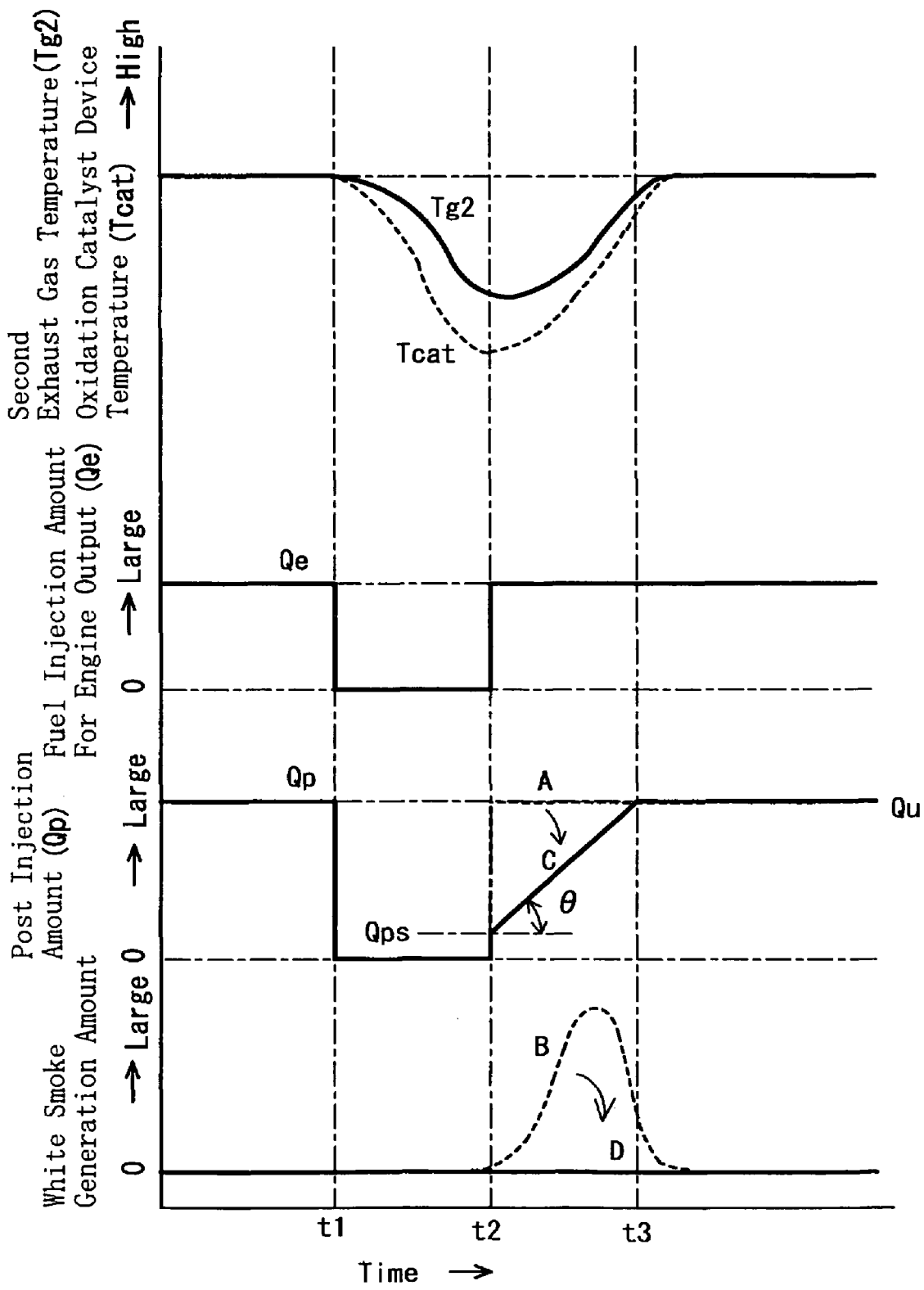
FIG. 5 is a graph schematically showing an effect of annealing control in the post injection.
Figure 6:
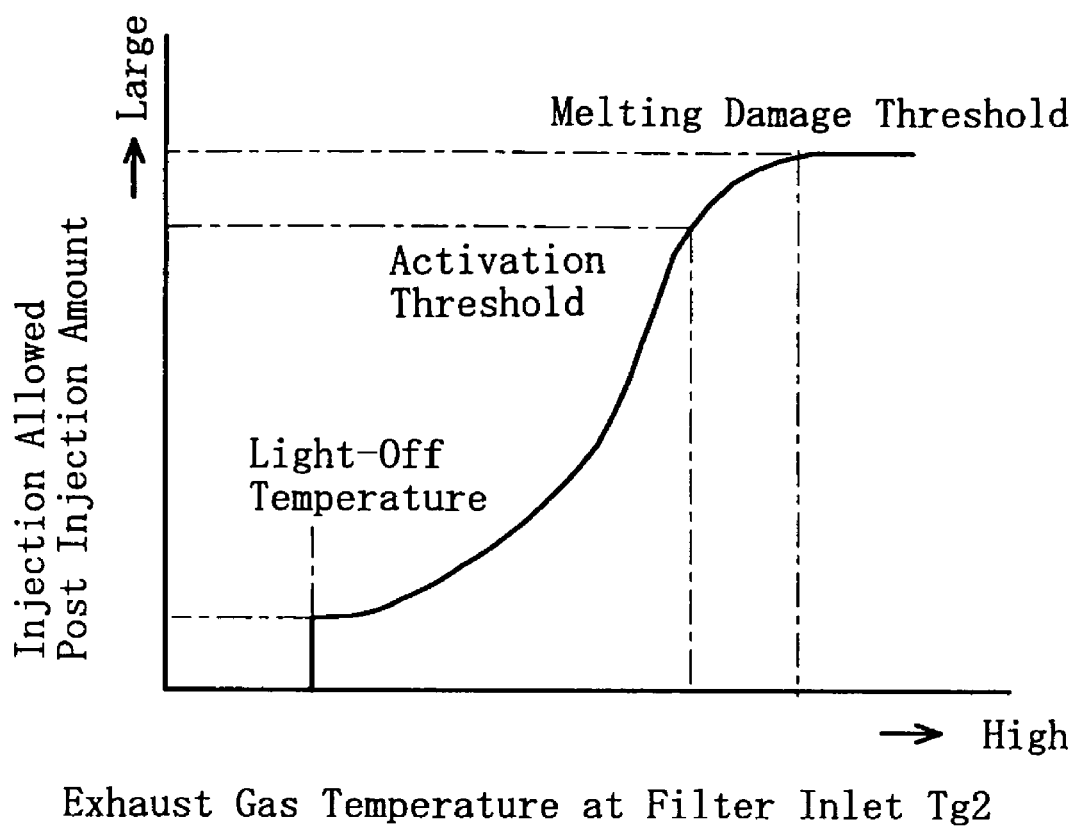
FIG. 6 is a graph showing a relation between a temperature of exhaust gas at a filter inlet and an injection-allowed post injection amount.

In the annealing control, an injection initial value Qps and an increasing speed θ are determined and then increased linearly as shown in FIG. 5, for example. Alternatively, they may be increased in a stepped manner or in a curved state. They are preferably set through an experiment or the like so that generation of white smoke is less, temperature rise of the oxidation catalyst is rapid, and moreover, control is relatively simple. The optimal injection initial value and the increasing speed of the annealing control are determined by the model of the engine and the exhaust gas purification system, and they are set in advance according to the type and the system and then stored in the controller 30.

According to the above exhaust gas purification method and the exhaust gas purification system 1, since the upper limit value Qu is set for the post injection amount Qp at the post injection in the forced regeneration control, the unburned fuel supplied into the exhaust gas can be surely oxidized regardless of the operation state of the diesel engine (internal combustion engine) 10 at the forced regeneration of the filter (DPF) 12b with catalyst. Thus, generation of white smoke, which is an outflow of the unburned fuel, can be prevented.

When the post injection is resumed and the post injection amount Qp is increased, the annealing control is also conducted, and then, generation of white smoke caused by an actual temperature of an oxidation catalyst lower than the temperature of the oxidation catalyst estimated from the detected temperature Tg1 (or Tg2) by the exhaust gas temperature sensor 22 (or 23) can be prevented.

Next, the annealing control will be described in more detail referring to FIG. 5. As shown in FIG. 5, if the accelerator pedal is released for deceleration or the like and then, stepped on again after a while during the forced regeneration, the fuel injection amount Qe for in-cylinder combustion and the post injection amount Qp interlocked with the fuel injection amount become zero by release of the accelerator pedal. And the second exhaust gas temperature Tg2, which is the temperature measured by the filter inlet exhaust-gas-temperature sensor 23, drops. However, when the accelerator pedal is stepped on again, the second exhaust gas temperature Tg2 becomes higher than the temperature in the center.

That is, since a flow velocity of the exhaust gas G is faster in the center than on the outer circumference, when the fuel injection is stopped, the temperature in the center of the oxidation catalyst device 12a is lowered faster. Thus, a gap is generated between the second exhaust gas temperature Tg2 measured on the outer circumference and an actual temperature Tcat in the center of the oxidation catalyst device 12a.

Therefore, if the post injection amount Qp is controlled by the second exhaust gas temperature Tg2 when the fuel injection is resumed, though the temperature Tcat in the center of the oxidation catalyst device 12a is lowered than the second exhaust gas temperature Tg2, it is recognized as the temperature of the oxidation catalyst is high and the oxidation capacity is high. And when the post injection is conducted by the post injection amount Qp according to the second exhaust gas temperature Tg2 as A shown in FIG. 5, the excessive unburned fuel (HC) will be supplied. Thus, the oxidation processing can not be conducted with the oxidation catalyst, and white smoke might be generated as B.

However, according to the present invention, during the post injection in the forced regeneration, when the fuel injection is stopped once and then, resumed as in a case where the accelerator pedal is released and then, stepped on at the next time, regardless of a difference in the elapsed time till then, the unburned fuel supply amount Qp by the post injection is not rapidly brought close to the upper limit value Qu but gradually increased to the upper limit value Qu by the annealing control as C shown in FIG. 5 when the post injection is resumed after it is stopped once. Thus, generation of white smoke can be restrained as D shown in FIG. 5, and the problem of white smoke generation at re-acceleration can be solved. In this annealing control, the initial injection amount Qps at resumption and the increasing speed θ after that are defined.

In the above embodiment, a combination of the oxidation catalyst device on the upstream side and the filter (DPF) with catalyst on the downstream side was described as an example of the exhaust gas purification device of the exhaust gas purification system, but it may be a filter (DPF) carrying the oxidation catalyst. Moreover, the post injection was described as a method of supplying the unburned fuel to the upstream side of the oxidation catalyst, but a method of direct injection in an exhaust pipe, wherein an unburned fuel supply device is arranged in the exhaust passage 14 and the unburned fuel is directly injected into the exhaust passage 14 from the unburned fuel supply device, may be employed.

Though not described in the above control flows in FIG. 2 and FIG. 3 in order to avoid complexity, the second exhaust gas temperature Tg2 is usually monitored all the time in order to prevent abnormal combustion of the PM in the filter 12b with catalyst, and if the second exhaust gas temperature Tg2 exceeds a predetermined determining value (fourth determining temperature Tc4) higher than the second determining value Tc2 at Step S18, the post injection or the like may be stopped and only the multiple injection may be conducted.

INDUSTRIAL APPLICABILITY

The exhaust gas purification method and the exhaust gas purification system of the present invention having the above-mentioned excellent advantages can be used extremely effectively in an exhaust gas purification system provided in an internal combustion engine or the like mounted on an automobile and conducting control of supplying an unburned fuel to an upstream side of an oxidation catalyst for oxidation so as to raise a temperature of a DPF.

What is claimed is:

1. An exhaust gas purification system comprising an exhaust gas purification device having an oxidation catalyst device carrying an oxidation catalyst and a diesel particulate filter arranged in order from an upstream side or an exhaust gas purification device having a diesel particulate filter carrying an oxidation catalyst and a regeneration control device for conducting control of forced regeneration of the diesel particulate filter arranged in an exhaust passage of an internal combustion engine, in which at forced regeneration of the diesel particulate filter, when a catalyst temperature index temperature indicating a temperature of the oxidation catalyst becomes equal to a predetermined determining temperature or above, the regeneration control device conducts control of raising a temperature of the diesel particulate filter by supplying an unburned fuel to the upstream side of the oxidation catalyst to oxidize the unburned fuel by the oxidation catalyst, wherein:

the regeneration control device sets a minimum value of a first upper limit value acquired by subtracting a fuel injection amount for in-cylinder combustion from a first combustible fuel amount limited by an air/fuel ratio and a second upper limit value acquired by subtracting the fuel injection amount for in-cylinder combustion from a second combustible fuel amount limited by an atmospheric pressure as an upper limit value for the unburned fuel supply amount.

2. The exhaust gas purification system according to claim 1, wherein the regeneration control device sets a minimum value of the first upper limit value, the second upper limit value, and a third upper limit value, which is a third combustible fuel amount which can be oxidized by the oxidation catalyst limited by the catalyst temperature index temperature and an engine speed as an upper limit value for the unburned fuel supply amount.

3. The exhaust gas purification system according to claim 1, wherein during the forced regeneration, if the fuel injection amount for in-cylinder combustion and the unburned fuel supply amount are to be increased, respectively after the fuel injection amount for in-cylinder combustion and the unburned fuel supply amount are reduced, the regeneration control device sets the unburned fuel supply amount at the upper limit value or less and conducts annealing control of gradually increasing the unburned fuel supply amount to the upper limit value.

4. An exhaust gas purification method, in an exhaust gas purification system comprising an exhaust gas purification device having an oxidation catalyst device carrying an oxidation catalyst and a diesel particulate filter arranged in order from an upstream side or an exhaust gas purification device having a diesel particulate filter carrying an oxidation catalyst arranged in an exhaust passage of an internal combustion engine, in which at forced regeneration of the diesel particulate filter, when a catalyst temperature index temperature indicating a temperature of the oxidation catalyst becomes equal to a predetermined determining temperature or above, control of raising a temperature of the diesel particulate filter is conducted by supplying an unburned fuel to the upstream side of the oxidation catalyst to thereby oxidize the unburned fuel by the oxidation catalyst, wherein:

a minimum value of a first upper limit value acquired by subtracting a fuel injection amount for in-cylinder combustion from a first combustible fuel amount limited by an air/fuel ratio and a second upper limit value acquired by subtracting the fuel injection amount for in-cylinder combustion from a second combustible fuel amount limited by an atmospheric pressure is set as an upper limit value for the unburned fuel supply amount.

5. The exhaust gas purification method according to claim 4, wherein a minimum value of the first upper limit value, the second upper limit value, and a third upper limit value, which is a third combustible fuel amount which can be oxidized by the oxidation catalyst limited by the catalyst temperature index temperature and an engine speed, is set as an upper limit value for the unburned fuel supply amount.

6. The exhaust gas purification method according to claim 4, wherein during the forced regeneration, after the fuel injection amount for in-cylinder combustion and the unburned fuel supply amount are reduced, if the fuel injection amount for in-cylinder combustion and the unburned fuel supply amount are to be increased, respectively, the unburned fuel supply amount is set at the upper limit value or less and annealing control of gradually increasing the unburned fuel supply amount to the upper limit value is conducted.

\* \* \* \* \*